Patented May 20, 1930

1,759,062

UNITED STATES PATENT OFFICE

LEONARD B. NEIGHBOUR, OF MOLINE, ILLINOIS, ASSIGNOR TO DEERE & COMPANY, OF MOLINE, ILLINOIS, A CORPORATION OF ILLINOIS

WINDLASS

Application filed August 4, 1927. Serial No. 210,539.

The present invention relates to improvements in a windlass, and it has been one of my objects to provide a construction which will afford a large gear ratio. The mechanical advantage thus obtained enables large forces to be exerted and is of considerable advantage in hoisting apparatus as it avoids the necessity of using extensive tackle rigging.

It is a further object of the invention to provide a windlass which will be self-locking in all positions, and in either direction of rotation. This is a marked improvement over the use of a pawl and ratchet mechanism for securing the locking action, inasmuch as the latter is only lockable at the points determined by the teeth in the ratchet wheel, and the release of the pawl in a windlass of this type, leaves the windlass without any locking function whatever.

It is still another object of the invention to provide a construction of windlass in which the operating parts are all grouped substantially on a common axis, and wherein the large gear ratio is obtained by the use of only two gear elements, thus enabling the device to be made very compact and to be produced at low cost.

Referring to the accompanying drawings illustrating a preferred embodiment of the invention:—

Figure 1:
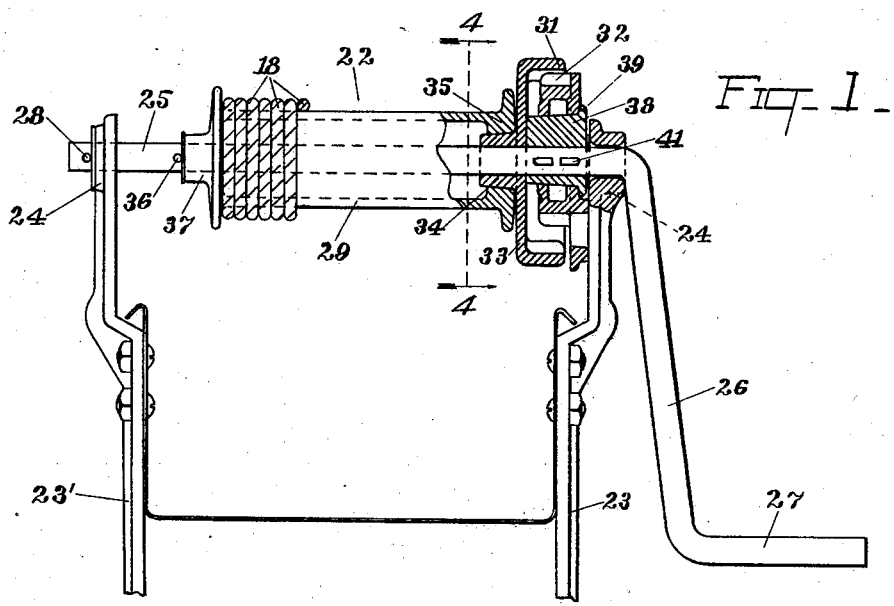
Fig. 1 is a view of the windlass, a portion thereof being shown in axial section.
Figure 2:
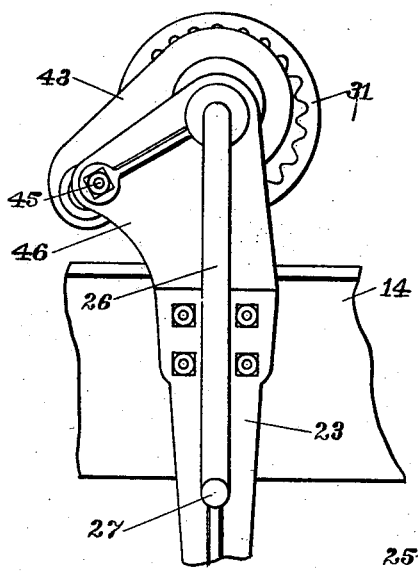
Fig. 2 is an end elevational view of the windlass, as seen from the crank end.
Figure 3:
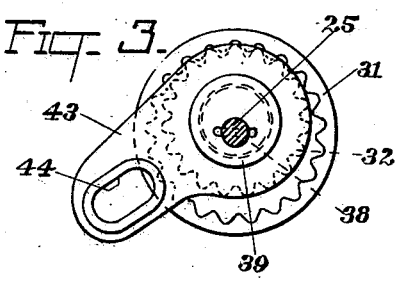
Fig. 3 is an end view illustrating the two gear elements.

Referring to Figs. 1 and 2, the windlass is mounted between end brackets 23 and 23' which are fixedly secured to a suitable framework 14. Formed in the upper portions of said brackets are bearing hubs 24. Rotatably mounted in such bearing hubs is a shaft 25, which is formed at one end with a radially extending crank portion 26 having an operating handle 27. The other end of the shaft is held against endwise displacement by a pin 28 passing through the shaft. A winding drum 29 is mounted on the shaft 25 for receiving a cable 18, one end of which is suitably fastened to the drum. The drum is rotatably supported on the shaft for a slow speed rotation effected through the speed reduction gearing at one end of the drum.

Figure 4:
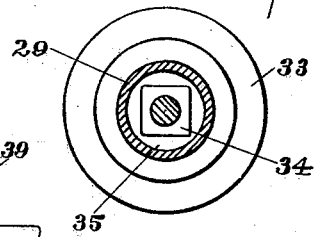
Fig. 4 is a transverse sectional view taken on the plane of the line 4—4 of Fig. 1.

This gearing comprises an internal driven gear 31 and an eccentrically mounted driving gear 32 which meshes therewith. The internal gear comprises a radial web portion 33 from the inner side of which extends a bearing hub 34, rotatably supported on the shaft 25. The outer surface of such hub is of square outline (Figure 4), and the same fits non-rotatably within a square socket in the end hub 35 of the winding drum. The drum is held against moving endwise off the square hub 34 by a pin 36 which passes through the shaft 25 and bears against the hub 37 on the other end of the drum.

Figure 5:
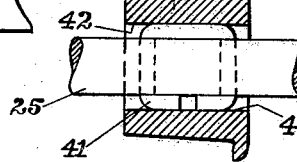
Fig. 5 is a detail sectional view showing the type of key connection preferably employed between the operating shaft and the eccentric.

The driving gear 32 has a cyclindrical bore therein which engages rotatably over the outer surface of an eccentric 38. As shown in Figures 1 and 5, the outer surface of the eccentric is preferably given a slight longitudinal taper, and the bore in the gear 32 is correspondingly tapered. A flange 39 on the outer end of the eccentric bears against the outer side of the gear and holds the latter in mesh with the internal gear. The eccentric is secured to the shaft 25 to rotate therewith through a key 41 which engages in diametrically opposite keyways 42 in the eccentric. This key preferably comprises a section of bar which has its ends passed through longitudinally-spaced diametrical holes in the shaft 25, the ends of such bar being bent over as shown in Figure 5. The ability of the shaft 25 and eccentric 38 to slide endwise relatively to each other through the slidable engagement of the key 41 in the keyways 42 takes care of manufacturing discrepancies and facilitates assembly of the parts.

Disposed on the outer side of the driving gear 32, and outside the plane of the internal driven gear 31, is an arm 43 which is constructed as a unitary part of the driving gear, either by forming the two integral, as shown, or by riveting the arm to the gear. Such arm extends to a suitable point of reaction, with which it has sliding, oscillatory connection. In the preferred construction shown, the arm has a longitudinal slot 44 in its outer end which has sliding connection with a bolt 45 carried in a laterally extending portion 46 of the bracket 23.

In the operation of the windlass, the rotation of the crank handle 27 will revolve the eccentric 38, which will in turn swing the spur gear 32 through an orbital path around the axis of the shaft 25, the ability of the arm 44 to shift endwise and to oscillate laterally permitting such motion. As the spur gear moves through this eccentric path its teeth are progressively crowded between the teeth of the internal gear 31, exerting a camming pressure thereon. The eccentric movement of the spur gear also results in a progressively shifting point of engagement between the two gears, which tends to carry the internal gear at a slow speed with the eccentric motion of the spur gear. The result is that the internal gear is carried around with the eccentric movement of the driving gear through a slow-speed, continuous rotation which is much slower than the rotation of the crank handle 27. The gear ratio is dependent upon the relative numbers of teeth in the two gears, it being noted that the internal gear has a greater number of teeth than the driving gear.

When the windlass is being used for raising a load or the like, it will automatically lock when the operator releases the handle. The load, acting as a counter torque on the internal gear 31, is incapable of rotating the same in a reverse direction, owing to the camming or wedging action of the eccentrically moving driving gear 32. When it is desired to lower the load, the crank handle 27 must be manually rotated in the reverse direction.

It will be observed that as a result of the foregoing arrangement and grouping of the parts, the two gears 31 and 32 both move through their fixed or orbital paths around the same axis on which the winding drum is situated. By such construction the shaft 25 and its two end bearings 24 serve as bearing supports for all of the moving parts, thus minimizing the number of bearings and the cost thereof, and producing a simple, compact construction.

What I claim is:

1. A windlass of the class described comprising spaced supporting bearings, a shaft rotatably mounted in said bearings, a crank at one end of said shaft beyond the adjacent bearing, a winding drum rotatably mounted on said shaft between said bearings, an internal gear mounted concentrically of said shaft between said bearings and operatively connected with said winding drum, an eccentric mounted on said shaft between said bearings, a key connecting said eccentric and shaft and permitting relative endwise sliding movement therebetween, a driving gear mounted on said eccentric and meshing with said internal gear, the cooperating bearing surfaces of said eccentric and said driving gear being tapered, and an arm extending from said driving gear and having oscillatable and slidable connection with a fixed point.

2. A windlass of the class described comprising a pair of spaced bearings, a shaft rotatably mounted in said bearings, a crank handle extending from one end of said shaft beyond the adjacent bearing, a drum member having a bearing at one end rotatably mounted directly on said shaft between said bearings, an internal gear member rotatably mounted on said shaft at one end of said drum member, one of said members having a polygonal hub extending therefrom and engaging in a polygonal socket in the other of said members, an eccentric non-rotatably connected to said shaft between said bearings, a driving gear mounted on said eccentric and meshing with said internal gear member, an arm extending from said driving gear and having a substantially radial slot therein, and a fixed member engaging in said slot and relative to which said arm has sliding and oscillating movement.

3. A windlass of the class described, comprising two spaced bearing brackets, a shaft rotatably mounted in said brackets, said shaft being constructed of round bar stock having one end extended beyond one of said bearing brackets and bent radially and then laterally to form a manually operated crank at one end of said shaft beyond the latter bearing bracket, a winding drum having a bearing at one end rotatably mounted directly on said shaft adjacent to the other bearing bracket, an internal gear rotatably mounted on said shaft at the other end of said winding drum, said internal gear having a tapered polygonal hub extending therefrom and engaging in a tapered polygonal socket in the adjacent end head of said winding drum, an eccentric mounted on said shaft between said internal gear and the adjacent bearing bracket, a key connecting said eccentric and said shaft non-rotatably but permitting relative endwise sliding movement therebetween, the outer face of said eccentric being adapted to abut the inner side of said last-mentioned bearing bracket for limiting endwise movement of said eccentric in that direction, a driving gear mounted on said eccentric and meshing with said internal gear, the cooperating bearing surfaces of the eccentric and of the driving gear being tapered inwardly toward said winding drum, an arm extending from said driving gear and having a substantially radial slot therein, an attaching portion integral with said latter bearing bracket, and a bolt carried by said attaching portion and engaging in said slot and relative to which said arm has sliding and oscillating movement.

LEONARD B. NEIGHBOUR.